(12) United States Patent
Yamamoto

(10) Patent No.: US 6,768,605 B2
(45) Date of Patent: Jul. 27, 2004

(54) FLEXIBLE DISK DEVICE, DISK FORMATTING METHOD, AND RECORDING/REPRODUCING METHOD

(75) Inventor: Masaki Yamamoto, Matsuyama (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/979,074

(22) PCT Filed: Apr. 16, 2001

(86) PCT No.: PCT/JP01/03255
§ 371 (c)(1),
(2), (4) Date: Nov. 16, 2001

(87) PCT Pub. No.: WO01/82295
PCT Pub. Date: Nov. 1, 2001

(65) Prior Publication Data
US 2002/0159178 A1 Oct. 31, 2002

(30) Foreign Application Priority Data
Apr. 20, 2000 (JP) ........... 2000-118786

(51) Int. Cl.⁷ ............... G11B 15/18
(52) U.S. Cl. ............... 360/69
(58) Field of Search ............... 360/77.08, 69, 360/48, 75, 121; 318/268

(56) References Cited

U.S. PATENT DOCUMENTS

| | | | |
|---|---|---|---|
| 4,298,897 A | 11/1981 | Arter et al. | 360/39 |
| 4,622,601 A | 11/1986 | Isozaki et al. | 360/48 |
| 4,897,746 A * | 1/1990 | Saito | 360/118 |
| 4,977,471 A * | 12/1990 | Nigam | 360/77.08 |
| 5,285,341 A * | 2/1994 | Suzuki et al. | 360/121 |
| 5,311,378 A | 5/1994 | Williams et al. | 360/77.03 |
| 5,412,516 A * | 5/1995 | Kennedy et al. | 360/121 X |
| 5,434,722 A * | 7/1995 | Bizjak et al. | 360/69 |
| 5,537,277 A * | 7/1996 | Kato | 360/121 |
| 5,771,142 A * | 6/1998 | Maurice et al. | 360/121 |
| 5,877,910 A | 3/1999 | Williams et al. | 360/66 |
| 6,201,657 B1 * | 3/2001 | Shimizu et al. | 360/73.03 |

FOREIGN PATENT DOCUMENTS

| | | |
|---|---|---|
| EP | 0 344 759 | 12/1989 |
| JP | 58-171702 | 10/1983 |
| JP | 59-168904 | 9/1984 |
| JP | 5-101330 | 4/1993 |
| JP | 9-138987 | 5/1997 |

OTHER PUBLICATIONS

Australian Patent Office Written Opinion, Singapore Appln. No. 200107261–0. Mailed May 23, 2002.

* cited by examiner

Primary Examiner—David Hudspeth
Assistant Examiner—K. Wong
(74) Attorney, Agent, or Firm—Parkhurst & Wendel, L.L.P.

(57) ABSTRACT

Data which is greater in capacity than the prior arts is recorded and reproduced on and from a low-capacity recording medium. In a large-capacity flexible disk device having head sliders (4) loaded with a low-capacity magnetic head and a high-capacity magnetic head, a control means such as a CPU 14 and the like for controlling the low-capacity magnetic head and the high-capacity magnetic head is provided so that a high-capacity track format is written in a low-capacity recording medium (1) by the low-capacity magnetic head to record information, and the information recorded on the low-capacity recording medium (1) in a high-capacity track format is reproduced by means of the high-capacity magnetic head.

7 Claims, 4 Drawing Sheets

FLEXIBLE DISK DEVICE, DISK FORMATTING METHOD, AND RECORDING/REPRODUCING METHOD

TECHNICAL FIELD

The present invention relates to a flexible disk device, a disk formatting method, and a recording/reproducing method.

BACKGROUND ART

Conventionally, a large-capacity flexible disk device is known, in which recording and reproducing on and from both a high-capacity formatted recording medium and a low-capacity formatted recording medium, that are different in linear recording density and track density, are carried out.

For example, according to a large-capacity flexible disk device disclosed in Japanese Unexamined Patent Publication No. 3-156711, with respect to a high-capacity formatted recording medium, recording and reproducing is carried out by means of a high-capacity magnetic head and a data processing circuit for a high-capacity format, and with respect to a low-capacity formatted recording medium, recording and reproducing is carried out by means of a low-capacity magnetic head and a data processing circuit for a low-capacity format.

In Japanese Unexamined Patent Publication No. 3-156711, an attempt to write a greater quantity of information in a low-capacity formatted recording medium with a high-capacity magnetic head is described. However, since such high-capacity magnetic heads have a recording gap length that is conformable to a high-capacity formatted recording medium having a high linear recording density, a problem exists such that overwriting characteristics are degraded. Furthermore, of these, high-capacity magnetic heads which write in and read out information at a narrow data track width also have a problem such that an influence of displacement due to eccentricity and the like created during replacement of recording media is strongly exerted and data reproduction cannot be normally carried out.

Therefore, it has been an object to develop a technique such that by making full use of a plurality of types of magnetic heads and data processing circuits which are respectively installed in correspondence with a plurality of types of recording media having different capacities, data which is higher in capacity than the prior arts can be recorded in a low-capacity recording medium and the recorded data can be satisfactorily reproduced.

DISCLOSURE OF THE INVENTION

In order to achieve the above object, according to the present invention, a high-capacity track format is written in a low-capacity recording medium by a low-capacity magnetic head, information on the low-capacity recording medium is reproduced by a high-capacity magnetic head which corresponds to the written high-capacity track format, whereby it becomes possible to record data which is greater in capacity than the prior arts in the low-capacity recording medium and reproduce the recorded data satisfactorily.

That is, the present invention provides a flexible disk device comprising: a first magnetic head which has a wide recording gap width, and can write in and read out information, with respect to a low-capacity recording medium, at a wide track width based on the wide recording gap and in a low-capacity track format; and a second magnetic head which has a recording gap width that is narrower than that of the first magnetic head, and can write in and read out information, with respect to the high-capacity recording medium which is greater in capacity than the low-capacity recording medium, at a narrow track width based on the narrow recording gap and in a high-capacity track format which is greater in track density and linear density than the low-capacity recording medium, whereby the flexible disk device records and reproduces information on and from two or more types of recording media having different capacities, characterized in that a control means is provided for controlling the first magnetic head to operate at track intervals narrower than the recording gap width thereof so as to write a high-capacity track format in the low-capacity recording medium at a narrow track width, thereby to record information and to read out the information recorded on the low-capacity recording medium by the second magnetic head.

In addition, according to the present invention, the above-described flexible disk device comprises a third magnetic head which has a recording gap width that is narrower than that of the second magnetic head, and can read out information which has been recorded in a second high-capacity track format that is even greater in track density and linear density than the high-capacity track format that the second magnetic disk head can write in and read out, wherein the control controls the second magnetic head to operate at track intervals narrower than the recording gap width thereof so as to write a second high-capacity track format in the high-capacity recording medium at a narrow track width, thereby to record information and to read out the information recorded on the high-capacity recording medium by the third magnetic head.

In further detail, the above-described flexible disk device comprises a rotating means for rotating a recording medium which is placed thereon, a carriage which is loaded with the first and second magnetic heads, and data processing circuits for first and second formats which modulate information to be inputted in the first and second magnetic heads to data signals which correspond to a low-capacity or a high-capacity track format in accordance with designation and demodulate information read out by the respective magnetic heads, wherein the control means controls track positions of the first and second magnetic heads via the carriage and also selects either one of the data processing circuits for first and second formats.

In addition, the carriage is further loaded with a third magnetic head and includes a data processing circuit for a third format which demodulates information read out by the third magnetic head, wherein the control means controls track positions of the first, second, and third magnetic heads via the carriage and also selects any one of the data processing circuits for the first, second, and third formats.

In addition, the present invention provides a disk formatting method for formatting two or more types of recording media having different capacities, wherein with respect to a low-capacity recording medium, a first magnetic head which can write in and read out information in a low-capacity track format is operated at track intervals that are narrower than a recording gap width thereof, so as to write in a high-capacity track format which is greater in track density and linear density than the low-capacity track format.

Furthermore, the present invention provides a recording/reproducing method for recording and reproducing on and from two or more types of recording media having different capacities, wherein with respect to a low-capacity recording medium, a first magnetic head which can write in and read out information in a low-capacity track format is operated at track intervals that are narrower than a recording gap width thereof so as to write in a high-capacity track format which is greater in track density and linear density than the low-capacity track format, thereby to record information and to read out the information recorded on the low-capacity recording medium by a second magnetic head which can read out information in the high-capacity track format.

In general, a high-capacity magnetic head is designed to have a narrow recording gap length and a narrow gap width that are conformable to a high-capacity format that is high in linear recording density and track density, and is designed to write a high-capacity track format in a high-capacity recording medium at a narrow track width and at a high track density, thereby to record information and reproduce the recorded information. A low-capacity magnetic head which corresponds to this high-capacity magnetic head is designed to have a recording gap length and a gap width that are wider than those of the high-capacity magnetic head, write a low-capacity track format in a low-capacity recording medium at a wide track width and at a low track density, thereby to record information and reproduce the recorded information.

The recording media herein referred to are flexible disks, wherein as the low-capacity recording media, there are 2HD disks, 2DD disks and the like and as the high-capacity recording media, there are 240 MB super disks, 120 MB super disks and the like. In addition, the low-capacity magnetic heads utilized for 2HD disks and 2DD disks include high density heads (HD heads) and the like, and an example thereof is a head having a recording gap width of 115 $\mu$m and track intervals of 187.5 $\mu$m. The high-capacity magnetic heads utilized for 240 MB super disks and 120 MB super disks include ultra high density heads (UHD heads) and the like, and an example thereof is a head having a recording gap width of 8 $\mu$m and track intervals of 10.2 $\mu$m.

However, in the present DESCRIPTION, the words "low-capacity" and "high-capacity" are used as words representing a relatively high capacity and a relatively low capacity, respectively.

According to the present invention, a high-capacity track format is written in a low-capacity recording medium by means of a low-capacity magnetic head, therefore, in spite of being at a wide track width corresponding to a recording gap width of the low-capacity magnetic head, format information and desirable information can be written at a high linear recording density and a high track density that are peculiar to the high-capacity track format. The information written in this low-capacity recording medium in the high-capacity track format is read out using a high-capacity magnetic head having a narrow recording gap width which corresponds to the high-capacity track format, therefore, even if track displacement occurs to some extent, the output does not drop and the information can be satisfactorily reproduced. Thus, it becomes possible to record data that is higher in capacity than the prior arts in a low-capacity recording medium and reproduce the data therefrom satisfactorily.

BEST MODE FOR CARRYING OUT THE INVENTION (Embodiment 1)

Hereinafter, an embodiment of the present invention will be described in detail with reference to the drawings.

Figure 1:
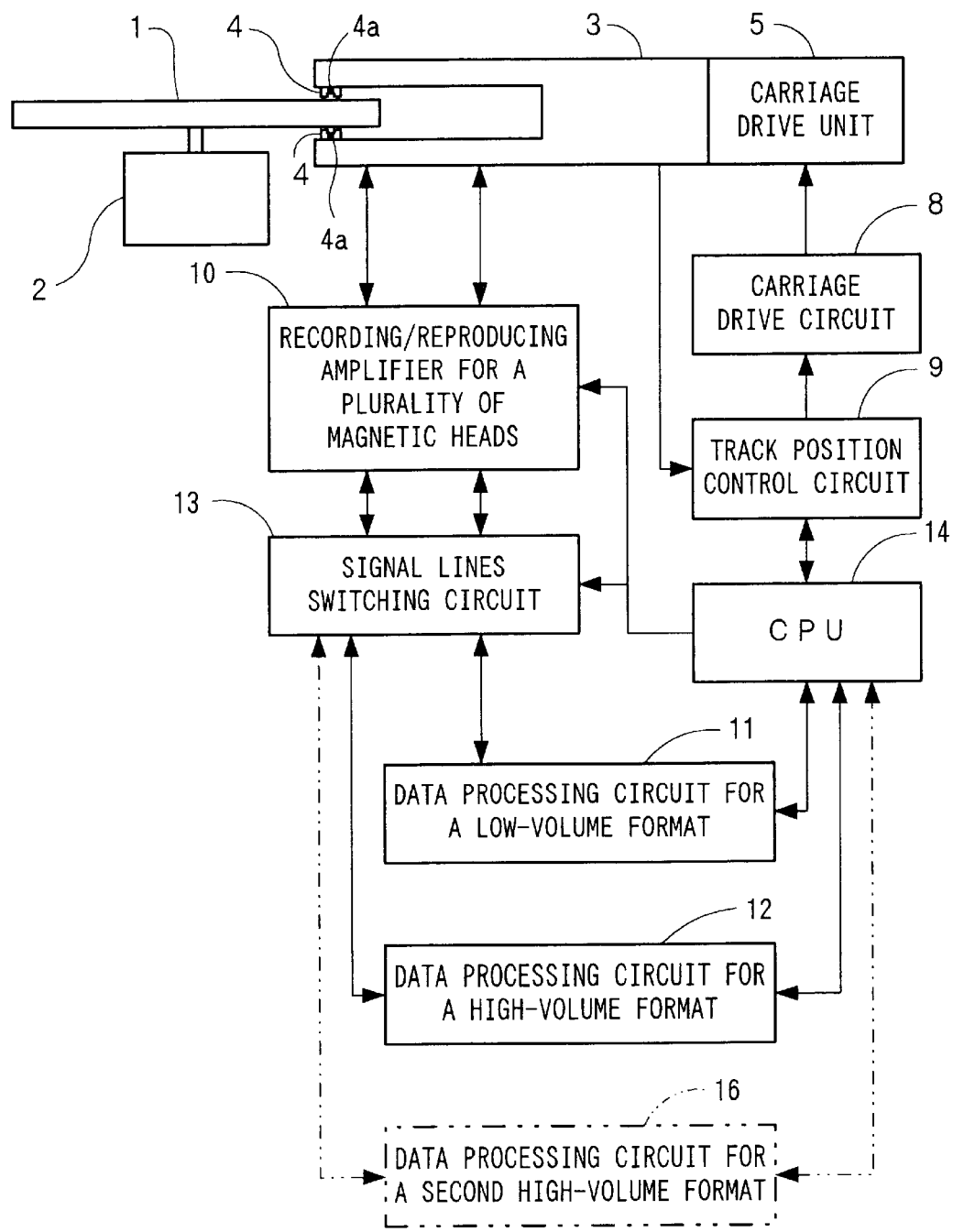
FIG. 1 is a schematic block diagram of a large-capacity flexible disk device according to an embodiment of the present invention.

Referring to the large-capacity flexible disk device shown in FIG. 1, 1 denotes a recording medium, and 2 denotes a spindle motor which drives to rotate the recording medium 1. 3 denotes a carriage loaded with head sliders 4 having track position control mechanisms 4a, and 5 denotes a carriage drive unit such as a voice coil motor or the like which shifts the carriage 3 at a pitch not more than the data track width.

Figure 2:
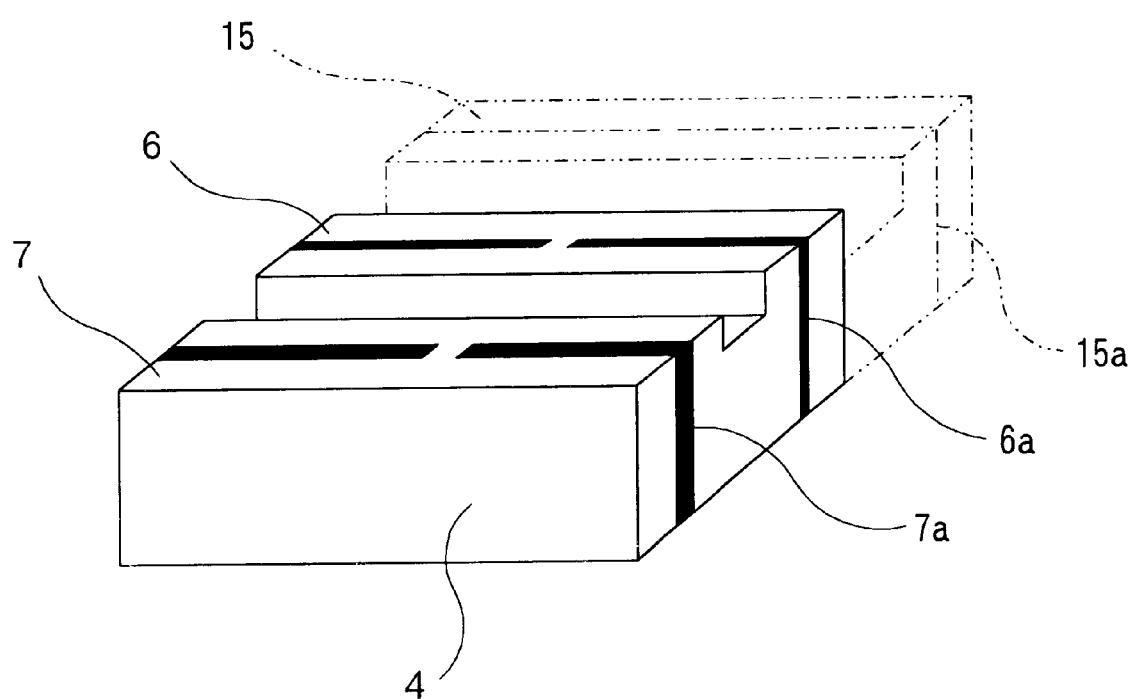
FIG. 2 is a perspective view of a head slider of the large-capacity flexible disk device of FIG. 1.

As shown in FIG. 2, each of the head sliders 4 is loaded with a high-capacity magnetic head 6 having a core 6a and a low-capacity magnetic head 7 having a core 7a and arranged above and below the recording medium 1 so that recording and reproduction can be carried out in either case where the recording medium 1 is a high capacity recording medium or a low-capacity recording medium. The above-described track position control mechanism 4a provided for the head slider 4 is, for example, an MR sensor 4 glass element, a laser servo or the like.

8 is a carriage drive circuit for driving the carriage drive unit 5, and 9 denotes a track position control circuit which drives the carriage drive unit 5 via the carriage drive circuit 8 and controls the track position of the high-capacity magnetic head 6 and the low-capacity magnetic head 7 of the carriage 3. Position control by the track position control circuit 9 is carried out based on information such as an encoder signal and the like from the track position control mechanisms 4a.

10 denotes a recording/reproducing amplifier for a plurality of magnetic heads which amplifies recording/reproducing signals of the high-capacity magnetic head 6 and the low-capacity magnetic head 7, 11 denotes a data processing circuit for a low-volume format, 12 denotes a data processing circuit for a high-volume format, and 13 denotes a signal line switching circuit.

14 denotes a CPU and this CPU 14 controls the above-described respective circuits and the recording/reproducing amplifier for a plurality of magnetic heads 10.

Operations in the above construction will now be described.

A high-capacity format is used for the high-capacity recording medium 1.

When writing data, the writing data is transmitted from the CPU 14 to the data processing circuit for high-volume format 12 and modulated to high-capacity codes, that are, for example, 1/7RLL, 8/9GCR, 16/17Code and the like. On the other hand, by an instruction from the CPU 14, the track position control circuit 9, the carriage drive circuit 8, and the carriage drive unit 5 are driven and the track position of the high-capacity magnetic head 6 of the carriage 3 is controlled. In addition, by an instruction from the CPU 14, a switchover to a signal line for a high-capacity magnetic head is carried out in the signal line switching circuit 13, the writing data, which has been modulated to the aforementioned high-capacity codes, is sent through the signal line switching circuit 13 and a recording circuit of the recording/reproducing amplifier for a plurality of magnetic heads 10 to the high-capacity magnetic head 6 of the carriage 3, and written in the recording medium 1 by the high-capacity magnet head 6 in a high-capacity format in which gaps are created between track formats.

When reproducing the data written in the recording medium 1, an instruction from the CPU 14 is sent to the recording/reproducing amplifier for a plurality of magnetic heads 10, the high-capacity magnetic head 6 of the carriage 3 is selected, and the data is read out by the high-capacity magnetic head 6. The data thus read out is signal-amplified by an amplifying circuit of the recording/reproducing amplifier for a plurality of magnetic heads 10, sent through the signal line for a high-capacity magnetic head of the signal line switching circuit 13 to the data processing circuit for a high-volume format 12, demodulated therein, and taken out by the CPU 14.

For the low-capacity recording medium 1, a method using a low-capacity format and a method using a high-capacity format are possible.

When writing data, upon an instruction from a host such as a personal computer or the like, in the low-capacity recording medium 1 by means of a low-capacity format, the writing data is transmitted from the CPU 14 to the data processing circuit for a low-volume format 11, modulated to low-capacity codes such as, for example, FM, MFM and the like, sent through a signal line for a low-capacity format of the signal line switching circuit 13 and the recording circuit of the recording/reproducing amplifier for a plurality of magnetic heads 10 to the low-capacity magnetic head 7, and written in the recording medium 1 by the low-capacity magnetic head 7 in a low-capacity format in which gaps are created between track formats. Reproduction of the data is carried out by following a course reverse thereto.

When writing data in the low-capacity recording medium 1 by means of a high-capacity format, the writing data is transmitted from the CPU 14 to the data processing circuit for high-volume format 12 and modulated to high-capacity codes, that are, for example, 1/7RLL, 8/9GCR, 16/17code and the like.

On the other hand, by an instruction from the CPU 14, the track position control circuit 9, the carriage drive circuit 8, and the carriage drive unit 5 are driven and the track position of the low-capacity magnetic head 7 of the carriage 3 is controlled. In addition, by an instruction from the CPU 14, a switchover to a signal line for a low-capacity magnetic head is carried out in the signal line switching circuit 13, the writing data, which has been modulated to the high-capacity codes, is sent through the signal line switching circuit 13 and the recording circuit of the recording/reproducing amplifier for a plurality of magnetic heads 10 to the low-capacity magnetic head 7 of the carriage 3, and written in the recording medium 1 by the low-capacity magnet head 7.

When reproducing the data written in the recording medium 1, an instruction from the CPU 14 is sent to the recording/reproducing amplifier for a plurality of magnetic heads 10, the high-capacity magnetic head 6 of the carriage 3 is selected, and the data is read out by the high-capacity magnetic head 6. The data thus read out is signal-amplified by the amplifying circuit of the recording/reproducing amplifier for a plurality of magnetic heads 10, sent through the signal line for a high-capacity magnetic head of the signal line switching circuit 13 to the data processing circuit for a high-volume format 12, demodulated therein, and taken out by the CPU 14.

Recording and reproducing on and from the low-capacity recording medium 1 in a high-capacity format will now be described in detail.

Figure 3:
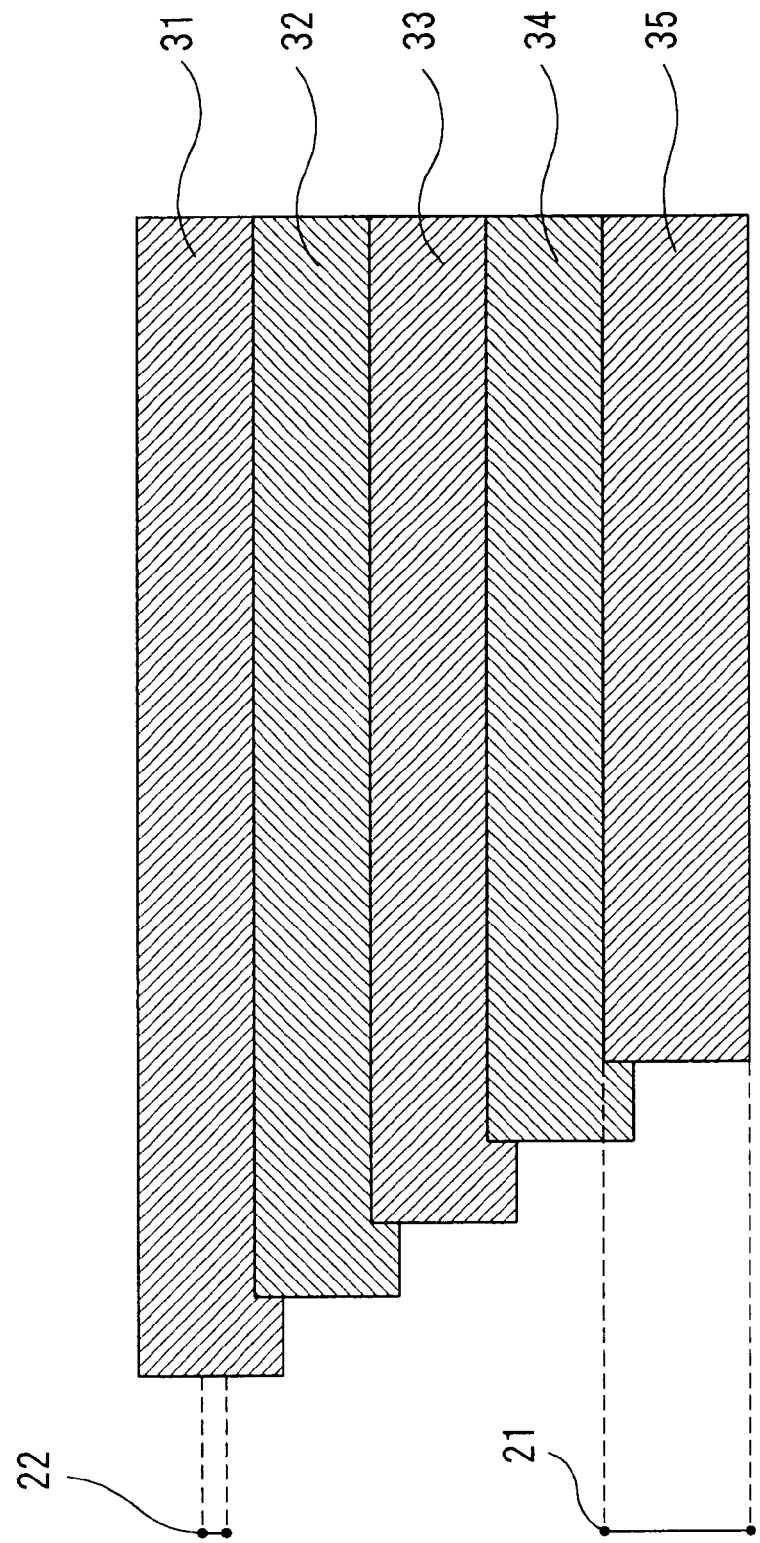
FIG. 3 is an explanatory diagram showing a track pattern formatted by a low-capacity magnetic head.
Figure 4:
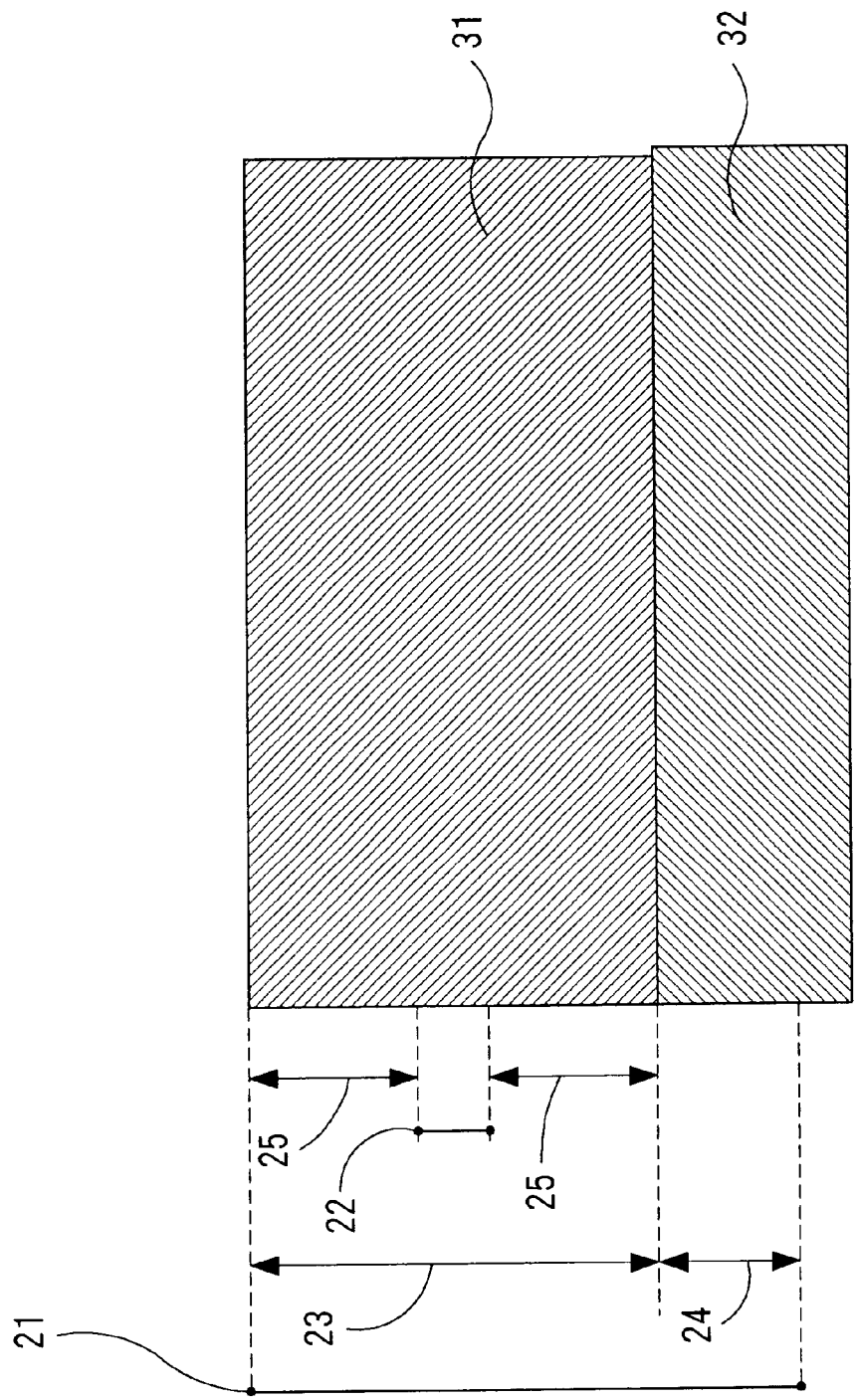
FIG. 4 is an explanatory diagram showing advantages in reproducing tracks, which have been formatted by the low-capacity magnetic head, by a high-capacity magnetic head.

As shown in FIG. 3, by the low-capacity magnetic head core 7a, track formats are written at track intervals narrower than its gap width 21 of, for example, 115 μm in order, for example, from the outer circumferential side toward the inner circumferential side. The track intervals are set to be greater than a gap width 22 of the high-capacity magnetic head core 6a of, for example, 8 μm. A track pattern to be formed is provided as the inner circumferential portions of the outer tracks 31, 32, 33, 34, 35 and so forth which are overwritten with the adjacent inner tracks 32, 33, 34, 35 and so forth. In addition, as representatively shown by the tracks 31 and 32 in FIG. 4, a data track width 23 of the outer track 31 becomes narrower than the gap width 21 of the low-capacity magnetic head core 7a by a width 24 that has been overwritten by the inner track 32 of, for example, 25 μm, resulting in 90 μm.

Therefore, format information and desirable information can be written at a data track width that is narrower than that of the original low-capacity format, at a high track density, and in a high-capacity format that has been modulated in high-capacity codes. Accordingly, data which is higher in capacity than the prior arts can be recorded in the low-capacity recording medium 1.

Then, the information within the 90 μm data track is reproduced by the above-described high-capacity magnetic head core 6a having the 8 μm gap width. At this time, since guard bands 25 each having 41 μm remain on both sides of the gap width 22, the influence from track displacement caused by eccentricity and the like created due to replacement of the recording medium 1 is eliminated or substantially reduced. Accordingly, reproduction of the information can be satisfactorily carried out.

Such a recording/reproducing method opens the way for utilizing a low-priced low-capacity recording medium as a recording medium having a higher capacity than that of the prior arts.

In addition, in the above-described embodiment, the large-capacity flexible disk device provided with two sets of the magnetic head and data processing circuit for a format has been described, however, as shown by virtual lines in FIG. 1 and FIG. 2, a second high-capacity magnetic head 15 having a core 15a which is narrower in the recording gap width than the high-capacity magnetic head 6 and a data processing circuit for a second high-capacity format 16 may further be arranged.

In such a case, with a combination of the high-capacity magnetic head 6 and the low-capacity magnetic head 7, a combination of the low-capacity magnetic head 7 and the second high-capacity magnetic head 15, or a combination of the high-capacity magnetic head 6 and the second high-capacity magnetic head 15, high-capacity information can be recorded and reproduced on and from a low-capacity recording medium in the same manner as the above.

It is also possible to provide four sets or more of the magnetic head and data processing circuit for a format. Also, the magnetic head having the highest capacity may be provided to become read-only. The format information and desirable information may be simultaneously written in, or written in order.

To give a particular example thereof, in a drive provided with a high-capacity magnetic head (a recording gap width of 8 μm) corresponding to a super disk and a low-capacity magnetic head (a recording gap width of 115 μm) corresponding to a 2HD disk/2DD disk and also provided with reading and writing functions with respect to each disk, in a case where low-capacity formatting is executed for a 2HD disk (1.44 MB) by means of the low-capacity magnetic head, the data track width becomes 115 μm and the track intervals become 187.5 μm.

On the other hand, on the assumption that reproduction is carried out by the high-capacity magnetic head, by means of the low-capacity magnetic head, the track density is heightened by setting the data track width to 115 μm and the track intervals to 18.75 μm, and high-capacity formatting of 16/17 Code is executed for the same 2HD disk, whereby a recording capacity of 32 MB can be realized. Thus, it becomes possible to use the 2HD disk as a 32 MB recording medium.

Furthermore, a drive provided with a low-capacity magnetic head (a recording gap width of 115 μm), a first high-capacity magnetic head (a recording gap width of 8 μm), and a second high-capacity magnetic head (a gap width of 1.5 μm) is constructed, and on the assumption that reproduction is carried out by the second high-capacity magnetic head, by means of the first capacity magnetic head, the track density is heightened by setting the data track width to 8 μm and the track intervals to 2.0 μm, and high-capacity formatting of 16/17 Code is executed for a 240HD super disk, whereby the recording capacity can be heightened to 1.4 GB.

What is claimed is:

1. A flexible disk device for recording information on and reading information from a plurality of recording media having different capacities, comprising:

a first magnetic head having a wide first recording gap width, for writing information in and reading information from a low-capacity recording medium having a low-capacity track format, said writing and reading occurring in a wide track width based on said wide first recording gap and in a low-capacity track format;

a second magnetic head having a second recording gap width that is narrower than said first recording gap of said first magnetic head, for writing information in and reading information from a high-capacity recording medium having a high-capacity track format, which is greater in capacity than said low-capacity recording medium, said writing and reading occurring in a narrow track width based on said narrow recording gap and in a high-capacity track format which is greater in track density and linear density than said low-capacity recording medium, and control means for controlling said first magnetic head to operate at track intervals narrower than the first recording gap width thereof for writing in a high-capacity track format in said low-capacity recording medium at a narrow track width, and for controlling said second magnetic head for reading out information recorded on said low-capacity recording medium by said first magnetic head.

2. The flexible disk device as set forth in claim 1, further comprising:

a third magnetic head having a third recording gap width that is narrower than said second recording gap of the second magnetic head, for reading information which has been recorded in a second high-capacity track format that is greater in track density and linear density than the high-capacity track format, wherein the control means is for controlling said second magnetic head to operate sat track intervals narrower than the second recording gap width thereof for writing information in a second high-capacity track format in said high-capacity recording medium at a narrow track width, and for controlling said third magnetic head for reading the information recorded on said high-capacity recording medium by said third magnetic head.

3. The flexible disk device as set forth in claim 1, further comprising a rotating means for rotating a recording medium located thereon, a carriage comprising said first and second magnetic heads, and data processing circuits for first and second formats for modulating information to be inputted in said first and second magnetic heads to data signals which correspond to a low-capacity or a high-capacity track format in accordance with a designation and for demodulating information read by the respective magnetic heads, wherein the control means is for controlling track positions of said first and second magnetic heads via said carriage and also is for selecting either one of the data processing circuits for the first and second formats.

4. The flexible disk device as set forth in claim 2, wherein the carriage further comprises a third magnetic head and a data processing circuit for a third format which demodulates information read by said third magnetic head, and the control means is for controlling track positions of the first, second, and third magnetic heads via said carriage and also for selecting any one of the data processing circuits for the first, second, and third formats.

5. A flexible disc device as set forth in claim 1, wherein a track pattern is formatted so that the inner circumferential portions of outer tracks are overwritten by adjacent inner tracks.

6. A disk formatting method for formatting a plurality of types of recording media having different capacities, comprising:

with respect to a low-capacity recording medium, operating a first magnetic head for writing information in and reading information out in a low-capacity track format at track intervals that are narrower than a first recording gap width thereof, thereby writing information in a high-capacity track format which is greater in track density and linear density than said low-capacity track format.

7. A recording/reproducing method for recording and reproducing on and from two or more types of recording media having different capacities comprising:

operating a first magnetic head for writing information in and reading information from a low-capacity track format on a low-capacity recording medium, at track intervals that are narrower than a first recording gap width thereof, thereby writing information in a high-capacity track format which is greater in track density and linear density than said low-capacity track format, and reading with a second magnetic head said information written in said high-capacity track format on said low-capacity recording medium.

* * * * *